UNITED STATES PATENT OFFICE.

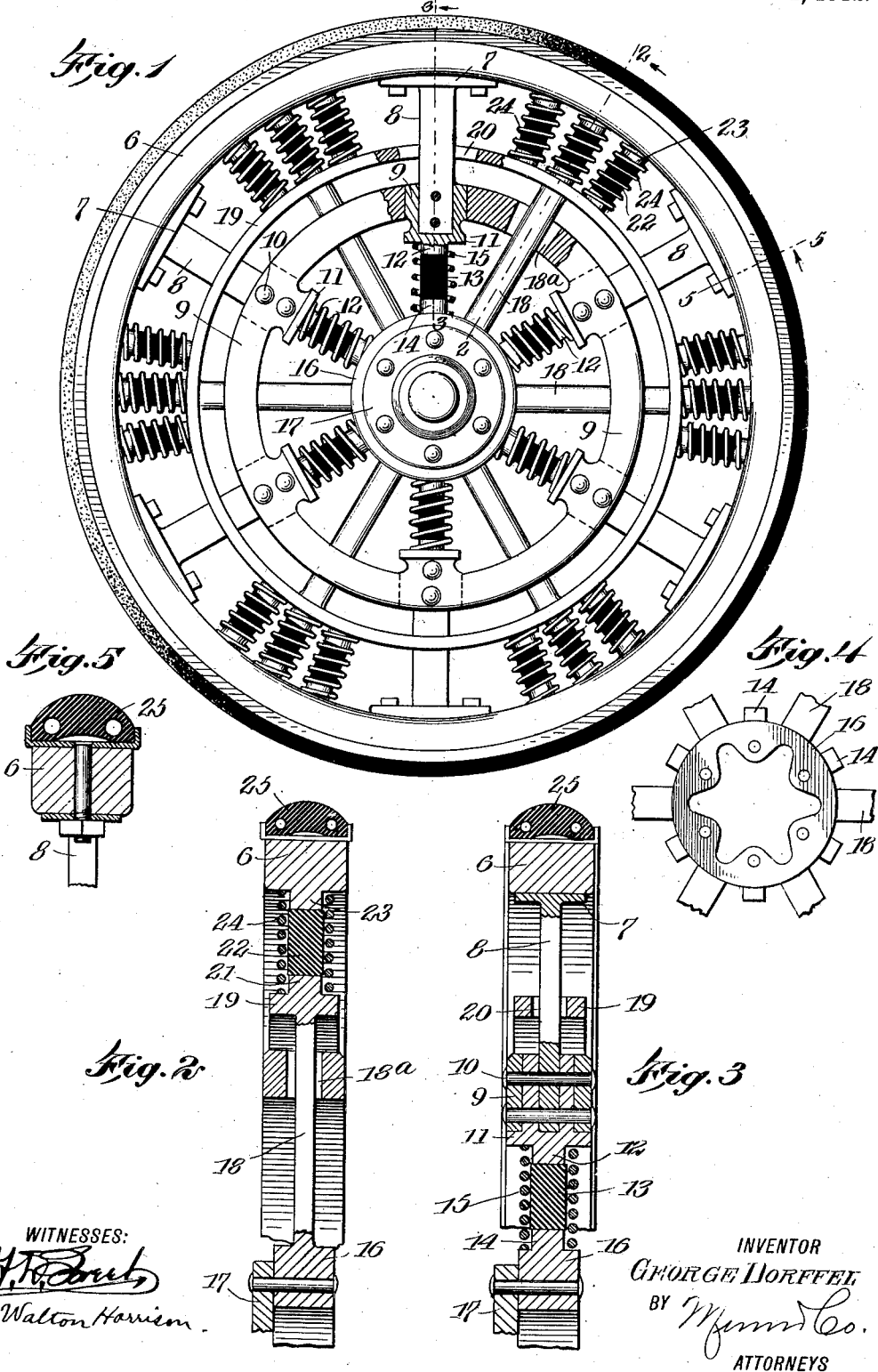

GEORGE DORFFEL, OF OAKLAND, CALIFORNIA.

RESILIENT WHEEL.

1,040,173.  Specification of Letters Patent.  Patented Oct. 1, 1912.

Application filed March 11, 1911. Serial No. 613,694.

*To all whom it may concern:*

Be it known that I, GEORGE DORFFEL, a citizen of the United States, and a resident of Oakland, in the county of Alameda and State of California, have invented a new and Improved Resilient Wheel, of which the following is a full, clear, and exact description.

My invention relates to resilient wheels and more particularly to the type of wheels used for vehicles and especially for automobiles and the like.

Reference is made to the accompanying drawings forming a part of this specification and in which like numbers indicate like parts.

Figure 1 is a side view partly in elevation and partly broken away showing an automobile wheel provided with my improved springs; Fig. 2 is a section on the line 2—2 of Fig. 1 looking in the direction of the arrow; Fig. 3 is a section on the line 3—3 of Fig. 1 looking in the direction of the arrow; Fig. 4 is a detail showing in fragmentary elevation the appearance of the hub when the cap and springs are removed; Fig. 5 is a section on the line 5—5 of Fig. 1 looking in the direction of the arrow.

The rim of the wheel is shown at 6, and engaging it internally are a number of feet 7 each being carried by a spoke 8. There are several of these spokes, and because of their position, I designate them as outer spokes.

At 9 is a stout ring which carries a number of bolts 10, the latter engaging also the outer spokes 8 so that the ring 9 and rim 6 are quite rigid relative to each other. The ring 9 is provided internally with a number of heads 11, each carrying centrally a button 12, the several buttons extending radially inward toward the hub. Engaging the buttons 12 are cylindrical plugs 13 of soft rubber. The inner ends of these plugs rest upon buttons 14. The buttons 12—14 and the plugs 13 are encircled by spiral springs 15.

At 16 is the body portion of the hub, and it is this part which carries the buttons 14.

At 17 is a cap which constitutes the outer face of the hub and is secured rigidly upon the hub. A number of spokes 18 are mounted rigidly upon the body portion 16 of the hub and extend radially outward from it. Each spoke 18 extends through a slot 18ᵃ in the ring 9.

At 19 is a ring which is provided with slots 20 through which the spokes 8 extend loosely, as will be understood from Fig. 1. The ring 19 is provided with buttons 21 which extend radially outward. These buttons are engaged by rubber plugs 22 similar to the plugs 13 above described, and each having the form of a solid cylinder. The plugs 22 are engaged at their outer ends by buttons 23 which are carried by the rim 6 and extend radially inward from the same. A number of springs 24 of substantially the same construction as the springs 15 are arranged in groups of three and encircle the plugs 22, as will be understood from Fig. 1.

The hub and the ring 19 being rigid relatively to each other and the rim 6 and the ring 9 being rigid relatively to each other, the springs arranged as shown in Fig. 1 cushion one of the rigid units as a whole relatively to the other, thus causing the wheel as a whole to be subject to a considerable degree of elasticity.

Having thus described my invention, I claim as new and desire to secure by Letters Patent:

1. A resilient wheel, comprising a hub provided with spokes and radial projections between the spokes, a ring surrounding the hub and provided with apertures through which the spokes loosely extend and with projections on its inner face opposite the projections of the hub, rubber plugs interposed between the projections, spiral springs into which the said projections extend and encircling the rubber plugs, a second ring surrounding the first ring and to which the spokes are secured, said ring being apertured and provided with radial projections on its outer face, a rim provided with projections on its inner face opposite the projections of the second ring, rubber plugs interposed between the projections, spiral springs into which the said projections extend and surrounding the plugs, and spokes secured to the rim and the first named ring, said spokes extending loosely through the apertures of the second ring.

2. A resilient wheel, comprising a hub provided with spokes, a ring surrounding the hub and provided with sockets and apertures through which the spokes loosely project, rubber plugs interposed between the hub and the ring at points opposite the sockets of the ring, spiral springs surrounding the plugs, a second ring surrounding the first ring and to which the spokes are secured, said ring being apertured between the points of attachment of the spokes thereto, spokes secured in the sockets of the first ring, passed loosely through the apertures of the second ring and secured to the rim, rubber plugs interposed between the second ring and the rim between the last named spokes, and spiral spring surround said plugs.

In testimony whereof I have signed my name to this specification in the presence of two subscribing witnesses.

GEORGE DORFFEL.

Witnesses:
 B. P. ZOBEL,
 W. D. LITTLETON.